(12) United States Patent
Sadana et al.

(10) Patent No.: US 10,257,019 B2
(45) Date of Patent: Apr. 9, 2019

(54) LINK AGGREGATION SPLIT-BRAIN DETECTION AND RECOVERY

(71) Applicant: Arista Networks, Inc., Santa Clara, CA (US)

(72) Inventors: Anshul Sadana, Santa Clara, CA (US); Prasanna Parthasarathy, Cupertino, CA (US); Adam James Sweeney, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 53 days.

(21) Appl. No.: 15/210,483

(22) Filed: Jul. 14, 2016

(65) Prior Publication Data

US 2017/0163473 A1 Jun. 8, 2017

Related U.S. Application Data

(60) Provisional application No. 62/263,480, filed on Dec. 4, 2015.

(51) Int. Cl.
| | | |
|---|---|---|
| *H04L 12/24* | (2006.01) | |
| *H04L 12/26* | (2006.01) | |
| *H04L 12/709* | (2013.01) | |
| *H04L 12/703* | (2013.01) | |
| *H04L 12/803* | (2013.01) | |
| *H04L 12/891* | (2013.01) | |

(52) U.S. Cl.
CPC ...... *H04L 41/0645* (2013.01); *H04L 41/0668* (2013.01); *H04L 41/0672* (2013.01); *H04L 43/0817* (2013.01); *H04L 43/10* (2013.01); *H04L 45/245* (2013.01); *H04L 45/28* (2013.01); *H04L 47/125* (2013.01); *H04L 47/41* (2013.01)

(58) Field of Classification Search
CPC ............ H04L 41/0645; H04L 41/0672; H04L 43/0817; H04L 43/10; H04L 47/41; H04L 45/245; H04L 45/28; H04L 47/125
See application file for complete search history.

(56) References Cited

U.S. PATENT DOCUMENTS

| | | | | |
|---|---|---|---|---|
| 6,134,673 A | * | 10/2000 | Chrabaszcz | G06F 11/1658 714/10 |
| 6,148,410 A | * | 11/2000 | Baskey | H04L 41/0654 714/4.11 |
| 6,678,835 B1 | * | 1/2004 | Shah | H04L 12/4641 714/4.12 |

(Continued)

OTHER PUBLICATIONS

PCT International Search Report and Written Opinion for PCT International Appln No. PCT/US2016/063935 dated Mar. 15, 2017 (17 pages).

*Primary Examiner* — Steven H Nguyen
(74) *Attorney, Agent, or Firm* — Womble Bond Dickinson (US) LLP

(57) ABSTRACT

Various embodiments are described herein that provide a network system comprising a set of peers within a link aggregation group (LAG), the first set of peers including a first network element and a second network element and a status resolution server to connect to the set of peers within the link aggregation group, wherein one or more peers within the LAG is to query the status resolution server to determine an operational status of a peer in the set of peers in response to detection of an apparent failure of the peer.

33 Claims, 10 Drawing Sheets

(56) References Cited

U.S. PATENT DOCUMENTS

| | | | | |
|---|---|---|---|---|
| 7,554,274 B2* | 6/2009 | Wang | H05B 37/0272 | 307/40 |
| 8,982,692 B2* | 3/2015 | Rajagopalan | H04L 45/245 | 370/221 |
| 9,231,821 B2* | 1/2016 | Arumugam | H04L 41/0654 | |
| 9,325,608 B2* | 4/2016 | Gautreau | H04L 45/245 | |
| 9,553,798 B2* | 1/2017 | Saltsidis | H04L 47/41 | |
| 9,734,025 B2* | 8/2017 | Joshi | G06F 11/2041 | |
| 2002/0133746 A1* | 9/2002 | Chen | G06F 11/2028 | 714/13 |
| 2002/0172158 A1* | 11/2002 | Hoefelmeyer | H04L 12/4604 | 370/241 |
| 2003/0061533 A1* | 3/2003 | Perloff | H04L 1/22 | 714/4.3 |
| 2003/0128706 A1* | 7/2003 | Mark | H04L 12/2852 | 370/395.1 |
| 2004/0078397 A1* | 4/2004 | Mehta | G06F 11/2094 | |
| 2004/0158766 A1* | 8/2004 | Liccione | G06F 11/2023 | 714/4.11 |
| 2006/0227704 A1* | 10/2006 | Nakagawa | H04L 45/00 | 370/217 |
| 2006/0280117 A1* | 12/2006 | Gopinadhan | G06F 11/203 | 370/216 |
| 2007/0081557 A1* | 4/2007 | Binetti | H04L 69/14 | 370/469 |
| 2007/0168711 A1* | 7/2007 | Chen | G06F 11/2025 | 714/11 |
| 2008/0126854 A1* | 5/2008 | Anderson | G06F 11/2028 | 714/13 |
| 2008/0240133 A1* | 10/2008 | Tanaka | H04L 45/245 | 370/401 |
| 2008/0294732 A1* | 11/2008 | Fletcher | H04L 43/0811 | 709/206 |
| 2009/0077413 A1* | 3/2009 | Dake | H04L 63/1408 | 714/4.1 |
| 2011/0010560 A1* | 1/2011 | Etchegoyen | G06F 11/2025 | 713/189 |
| 2011/0055622 A1* | 3/2011 | Arai | G06F 11/2025 | 714/4.2 |
| 2012/0093004 A1* | 4/2012 | Nishi | H04L 41/0631 | 370/242 |
| 2013/0329547 A1* | 12/2013 | Takase | H04L 41/0654 | 370/220 |
| 2014/0013384 A1 | 1/2014 | Webb et al. | | |
| 2014/0071810 A1* | 3/2014 | Kumagai | H04L 41/0654 | 370/220 |
| 2014/0126351 A1* | 5/2014 | Tatsumi | H04L 45/28 | 370/219 |
| 2014/0185461 A1 | 7/2014 | Gautreau et al. | | |
| 2014/0294010 A1 | 10/2014 | Biswas et al. | | |
| 2014/0301401 A1* | 10/2014 | Wang | H04L 49/70 | 370/395.53 |
| 2015/0124591 A1* | 5/2015 | Nakagawa | H04L 41/0659 | 370/225 |
| 2015/0172121 A1* | 6/2015 | Farkas | H04L 45/245 | 370/218 |
| 2015/0188722 A1* | 7/2015 | Bhagavathiperumal | H04L 12/1886 | 370/235 |
| 2015/0288559 A1* | 10/2015 | Yasuda | H04L 41/0654 | 370/217 |
| 2015/0312121 A1* | 10/2015 | Yasuda | H04L 41/0686 | 370/243 |
| 2015/0319083 A1 | 11/2015 | Fletcher et al. | | |
| 2016/0020939 A1* | 1/2016 | Ramasubramanian | H04L 41/0654 | 370/217 |
| 2016/0065407 A1* | 3/2016 | Saltsidis | H04L 41/0806 | 370/255 |
| 2016/0085648 A1* | 3/2016 | Joshi | G06F 11/2028 | 714/4.11 |
| 2016/0301579 A1* | 10/2016 | Djukic | H04L 41/5009 | |
| 2017/0163473 A1* | 6/2017 | Sadana | H04L 41/0645 | |
| 2017/0251077 A1* | 8/2017 | Kumar Eerpini | H04L 67/327 | |
| 2017/0257309 A1* | 9/2017 | Appanna | H04L 45/245 | |
| 2017/0288946 A1* | 10/2017 | Thomas | H04L 41/0654 | |

\* cited by examiner

LINK AGGREGATION SPLIT-BRAIN DETECTION AND RECOVERY

RELATED APPLICATIONS

Applicant claims the benefit of priority of prior, provisional application Ser. No. 62/263,480, filed Dec. 4, 2015, the entirety of which is incorporated by reference.

FIELD OF INVENTION

This invention relates generally to data networking and more particularly to the management of multi-chassis link aggregation in networked devices.

BACKGROUND OF THE DESCRIPTION

A network element (such as a router or switch) transmits and receives network data using one or more ports of that network element. Each port on the network element has a physical link speed that limits the rate at which network data can be transmitted from that port. The network element uses one or more queues to store the network data that is to be transmitted from one of the ports of the network element. The maximum data that a queue stores is determined by the available buffer memory and a buffer configuration for the queue. When the amount of network data that is to be transmitted by one of the ports on a network element, or the overall data transmitted by a network element, is greater than the port or network element can handle within a given period, network congestion can occur, resulting in increased latency for network data propagation through the nodes on the network.

One solution to localized network congestion is to enable link aggregation on a network device. Link aggregation applies to various methods of combining or aggregating multiple network connections in parallel in order to increase throughput to a network device beyond what a single connection could sustain. Network connections can be combined into a link aggregation group (LAG) that enables increased network throughput or connection redundancy in the case of failure of any one of the aggregated links. Additionally, multi-chassis LAG can be used to add node-level redundancy, allowing two or more network element nodes to share a common LAG endpoint. Various techniques are known in the art to perform failover in the event of the failure of one of the nodes in a multi-chassis LAG configuration. However, implementations known in the art are generally unable to distinguish between a node failure and a communication failure between the various nodes of a multi-chassis LAG configuration. A communication failure between two operational network elements in a multi-chassis configuration can create a condition known in the art as "split-brain scenario".

SUMMARY OF THE DESCRIPTION

Various embodiments are described herein to enable the detection of and recovery from a multi-chassis link aggregation split-brain scenario.

One embodiment provides for a network system comprising a set of peers within a link aggregation group (LAG), the first set of peers including a first network element and a second network element and a status resolution server to connect to the set of peers within the link aggregation group, wherein one or more peers within the LAG is to query the status resolution server to determine an operational status of a peer in the set of peers in response to detection of an apparent failure of the peer the detection of the apparent failure of the peer can include detection of a loss of communication with the peer over a peer link including one or more network connections and the status resolution server can be configured to to receive a query from the second network element and determine an operational status of the first network element. The second network element can periodically query the status resolution server to determine the operational status of the first network element. The status resolution server can then determine the operational status of the first network element in response to detection of a loss of communication with the first network element. The status resolution server can determine the operational status of the first network element via a query to the first network element, via a heartbeat protocol, or via a query to a central database of the first network element.

One embodiment provides for a non-transitory machine readable medium storing instructions which, when executed by one or more control plane processors of a network element, cause the network element to perform operations comprising configuring the network element as a first peer of a link aggregation group (LAG), the first peer coupled to a second peer via a peer link including one or more network connections; in response to a loss of communication over the peer link, assuming operations of the second peer; querying a status resolution server connected to the network element via a network to determine an operational status of the second peer; and resuming operation as the first peer in response to receiving an indication that the second peer is operational.

One embodiment provides for a network element comprising a control plane including one or more processors and memory, wherein the control plane is to configure the network element as a first peer of a link aggregation group (LAG) and a data plane coupled to the control plane, the data plane including a network interface having one or more peer ports and one or more non-peer ports, the one or more peer ports to couple to a second peer of the MLAG and the one or more non-peer ports to couple to an external device, wherein in response to a loss of communication with the second peer via the one or more peer ports, the control plane is to cause the network element to assume operational duties of the second peer and query a status resolution server for an operational status of the second peer.

One embodiment provides for a network system comprising a link aggregation group (LAG) including multiple network elements, the multiple network elements interconnected via a peer link including one or more network connections; a status resolution server to monitor operational status of network elements of the MLAG and a link state of the peer link; and wherein the status resolution server is further to detect occurrence of a split brain scenario caused by a failure of the peer link and automatically re-configure one or more network elements of the LAG to resolve the split brain scenario.

One embodiment provides for a method of managing operations of one or more network elements of a link aggregation group (LAG), the method comprising monitoring operational status of one or more network elements of the LAG; monitoring a link state of a peer link, the peer link including one or more network connections between the network elements of the LAG; detecting occurrence of a split brain scenario caused by a failure of the peer link; and automatically re-configuring one or more network elements of the LAG to resolve the split brain scenario.

Other system, methods, and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
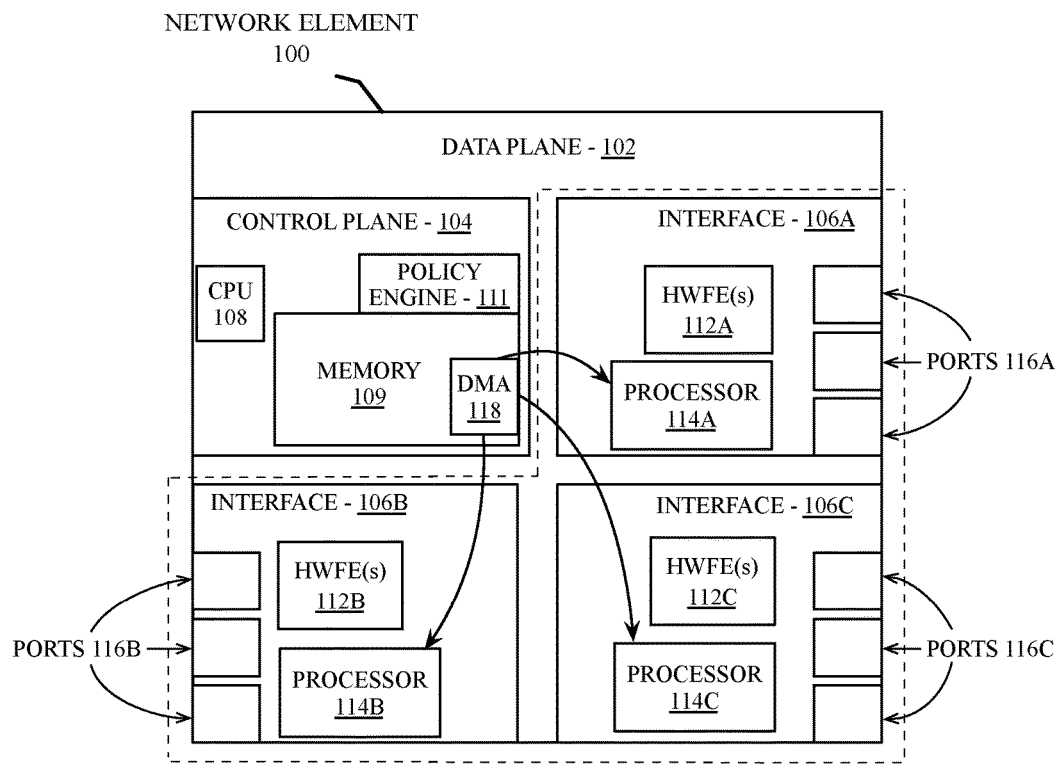
FIG. 1 is a block diagram of one embodiment of a network element including a data plane coupled to a control plane and several interface devices.

Embodiments described herein provide a multi-chassis LAG (MLAG) mechanism that enables an active-active link aggregation control protocol (LACP) connection to two or more network elements. In one embodiment, the MLAG mechanism includes logic to distinguish between a link failure and a node failure within the MLAG to detect and recover from a multi-chassis split-brain scenario. A split-brain scenario occurs when communication is lost between the network element nodes within a multi-chassis LAG and each node continues to operate as though the other node(s) in the LAG have failed. In some scenarios this can lead to network congestion or network errors due to forwarding loops.

To detect and recover from a split-brain scenario, network elements in an MLAG configuration can determine peer status via a network management system in communication with network elements within the network system. In one embodiment, an in-band network API is provided by the network management system to enable an MLAG peer to determine the status of other MLAG peers in the event of a peer-link failure between the peers. In one embodiment, the network management system may be used as an intermediary for communication between the peers as a substitute for the peer link connection until the peer-link can be re-established.

Embodiments may be configured to implement one of multiple verification and failover processes. In one embodiment, a secondary MLAG peer that suspects the failure of a primary peer can query the network management system for the status of the primary peer. In the event of the failure of the primary peer, the secondary peer can become the primary. In one embodiment, a secondary peer that suspects the failure of a primary peer can immediately become the primary peer, then query the network management system for peer status. In the event the primary peer is still active, the secondary-turned-primary peer can revert to a secondary state.

In one embodiment, an MLAG agent of a network management system can subscribe to a link status for peer ports connecting a primary and secondary MLAG peer. Via such subscription, state and status agents associated with the network management system can automatically notify the MLAG agent of any changes in the link status for peer links between peers in an MLAG domain. The MLAG agent may then proactively intervene to prevent any errors that may occur as a result of the failed peer link. Other methods and apparatuses are also described herein, including an overview of the network elements, network systems, and network management systems that are provided by the embodiments described herein.

To provide a thorough explanation of the various embodiments, numerous specific details are set forth herein. However, one having ordinary skill in the art will understand that embodiments may be practiced without these specific details. In some instances well-known components, structures, and techniques are not shown in detail to avoid obscuring key details within this description. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Network Elements and Network System

The processes depicted in the figures that follow, are performed by processing logic that comprises hardware (e.g., circuitry, dedicated logic, etc.), software (such as is run on a general-purpose computer system or a dedicated or specialized machine), or a combination of both. Although some of the processes are described below in terms of sequential operations, it should be appreciated that some of the operations described may be performed in a different order. Moreover, some operations may be performed in parallel rather than sequentially.

FIG. 1 is a block diagram of one embodiment of a network element 100 that includes a data plane 102 coupled to a control plane 104 and several interface devices 106A-C. In some network elements, the data plane 102 is referred to as the forwarding plane. In one embodiment, the control plane 104 includes central processing unit (CPU) 108 and memory 109 to store data. The CPU 108 can be used to process information for the control plane 104 and write configuration data for hardware forwarding engines 112A-C in the network interface devices 106A-C. Additionally, the CPU can read data from the hardware forwarding engines 112A-C. In one embodiment, the data plane 102 receives, processes, and forwards network data using various configuration data (e.g., forwarding, security, quality of service (QoS), and other network traffic processing information). The data plane 102 includes multiple network interface devices 106A-C (e.g., switches, routers, etc.) that can each receive, process, and/or forward network traffic. Each of the interface devices 106A-C includes multiple ports 116A-C that can be used to receive and transmit network data.

In one embodiment, for each received unit of network data, the data plane 102 determines a destination address for the network data, looks up the requisite information for that destination in one or more tables stored in the data plane, and forwards the data out the proper outgoing interface, for example, one of the interface devices 106A-C. In one embodiment, each of the interface devices 106A-C includes one or more hardware forwarding engines (HWFE(s)) 112A-C, processor 114A-C, and ports 116A-C, respectively. Each of the hardware forwarding engines 112A-C forwards data for the network element 100 by performing routing, switching, or other types of network forwarding. Each processor 114A-C can be used to accelerate various functions of the interface devices 106A-C. For example and in one embodiment, the processors 114A-C can program the corresponding hardware forwarding engines 112A-C. The processors 114A-C can also push data from the hardware forwarding engines 112A-C to a CPU 108 in the control plane 104.

In one embodiment, the control plane 104 gathers the configuration data for the hardware forwarding engines 112A-C from different sources (e.g., locally stored configuration data, via a command line interface, or other management channel (e.g., SNMP (Simple Network Management Protocol), Simple Object Access Protocol (SOAP), Representational State Transfer type Application Programming Interface (RESTful API), XML APIs, JSON APIs, Hypertext Transfer Protocol (HTTP), HTTP over Secure Sockets layer (HTTPs), Network Configuration Protocol (NetConf), Secure Shell (SSH), and/or another management protocol) and pushes this configuration data to the hardware forwarding engines 112A-C.

In one embodiment, the memory 109 that is used to store data for the control plane 104 is shared with the data plane 102. In such embodiment a direct memory access (DMA) controller 118 is coupled to the memory 109 to allow processors 114A-C direct access to the memory 109. In one embodiment, the control plane 104 includes a policy engine 111 to apply a QoS policy to network traffic flowing through the network element 100. The policy engine 111 can be configured to minimize the latency of some type of network traffic, or to apply traffic shaping policies on the overall flow of traffic through the network element, or within a larger network topology. Proper determination of real-time latency data within the network can be key to the implementation of effective QoS policy. In one embodiment, logic to perform the timing of network data flow is consolidated into the hardware of the data plane 102 of each network element 100.

The network element 100 can be incorporated into a network as any one or more of a switch, router, hub, bridge, gateway, etc., or any type of device that can provide access to a network (e.g., physical network, virtualized network, etc.). In various embodiments, different types of protocols can be used to communicate network (e.g., Ethernet, wireless, Synchronous Optical Networking (SONET), Fiber channel, Infiniband, etc.). The network data being communicated by the data plane 102 can be a stream of network frames, datagrams or data packets, or other types of discretely switched network data. In one embodiment, the network element 100 communicates network data between various networked devices using a variety of communicating techniques (e.g., layer-2 switching, layer-3 routing, traffic shaping, applying a quality of service (QoS) policy, etc.).

Figure 2:
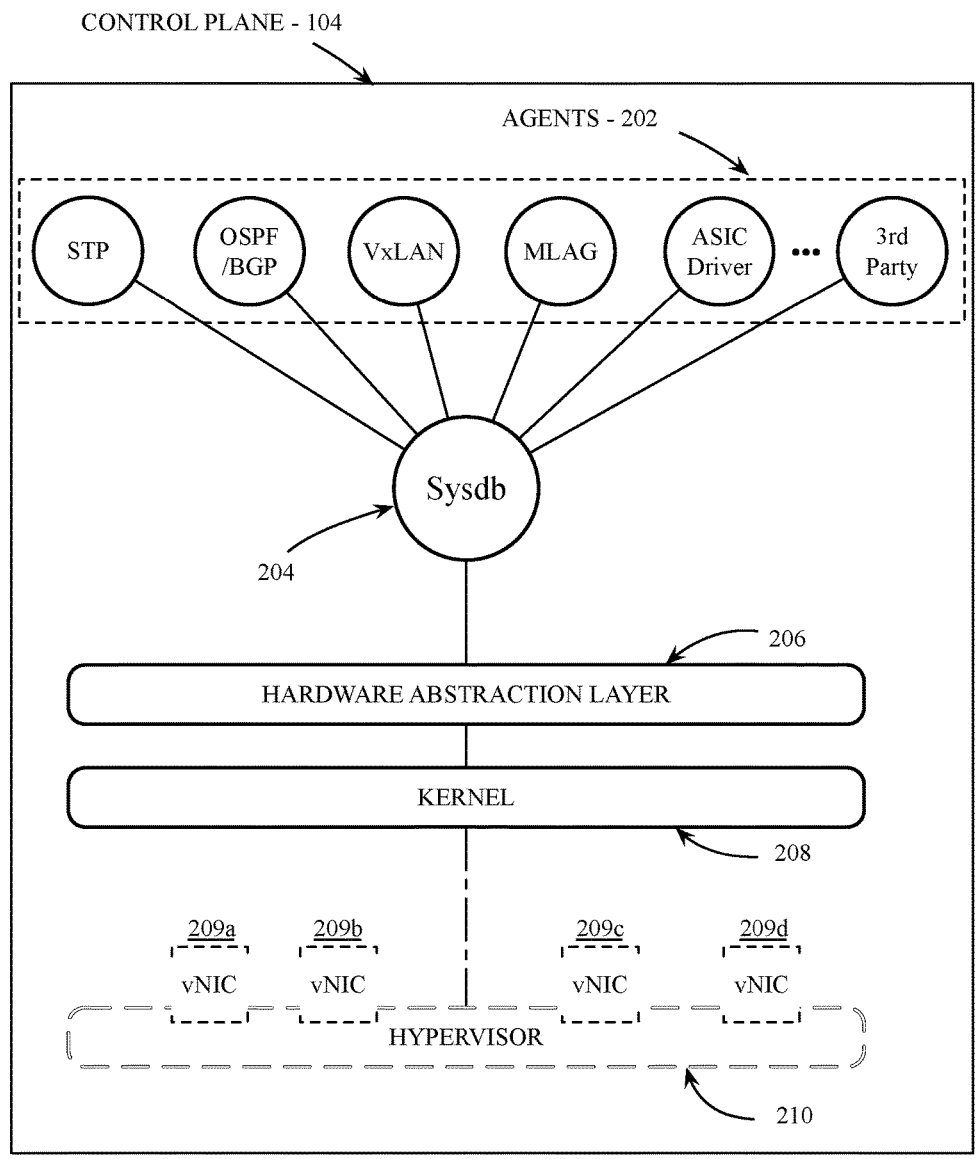
FIG. 2 is a block diagram of a network element operating system, according to an embodiment.

FIG. 2 is a block diagram of a network element operating system 200, according to an embodiment. In one embodiment, the network element operating system 200 resides in the control plane (e.g., control plane 104) of a network element 100 as in FIG. 1. The network element operating system 200 includes multiple agents 202 including, but not limited to agents to perform operations to implement Spanning Tree Protocol (STP), Open Shortest Path First (OSPF)/Border Gateway Protocol (BGP), Virtual eXtensible LAN (VXLAN), and Multi-Chassis Link Aggregation (MLAG). The agents can additionally include one or more forwarding drivers for an application specific integrated circuit (ASIC), as well as third-party agents. In one embodiment, the agents each communicate with a central system database (e.g., Sysdb 204). In one embodiment, the network element operating system 200 additionally includes a hardware abstraction layer 206 to abstract hardware specific details to enable the network element operating system 200 to operate on a variety of different hardware associated with different models and implementations of network elements. A kernel 208 provides core operating system functionality such as scheduling and base level system resource management. In one embodiment, the network element operating system 200 can be operated within a virtual machine, and can provide virtual network interface cards (vNIC 209a-d) via a hypervisor 210.

In one embodiment, each of the multiple agents 202 interfaces with the Sysdb 204 to record configuration state and operational status. In such embodiment, agents in the system can connect to the Sysdb 204 to send and receive configuration and status. Read and write permissions can be specified for each connection. In one embodiment, Sysdb utilizes an event-driven publish/subscribe model. If the configuration state of an agent changes, Sysdb can send an event notification to that agent, which will then update its local copy. Similarly when the agent writes to the Sysdb connection, the agent changes its local copy and the write returns immediately. This change notification can be buffered and asynchronously sent to Sysdb, which then notifies all other agents who have subscribed to the changed agent. In one embodiment Sysdb information is maintained in RAM, along with other status and state information, and once the network element is turned off or restarted, such information is lost. In other embodiments, network elements include high performance local storage to store Sysdb information in non-volatile memory.

In embodiments described herein, network element configuration status and operational state agent transmits Sysdb information, as well as forwarding configuration data, to one or more centralized collector nodes that archive status and status information for multiple network elements on a network. The collected information can include all data in memory of the network element, including but not limited to interface tables, ARP tables and routing tables, system logs (e.g., syslog, agent logs), and hardware specific state, such as interface counters, service counters, etc. In one embodiment, data visible to the kernel 208 and/or hardware abstraction layer 206 can also be collected.

Multi-Chassis Link Aggregation

Figure 3:
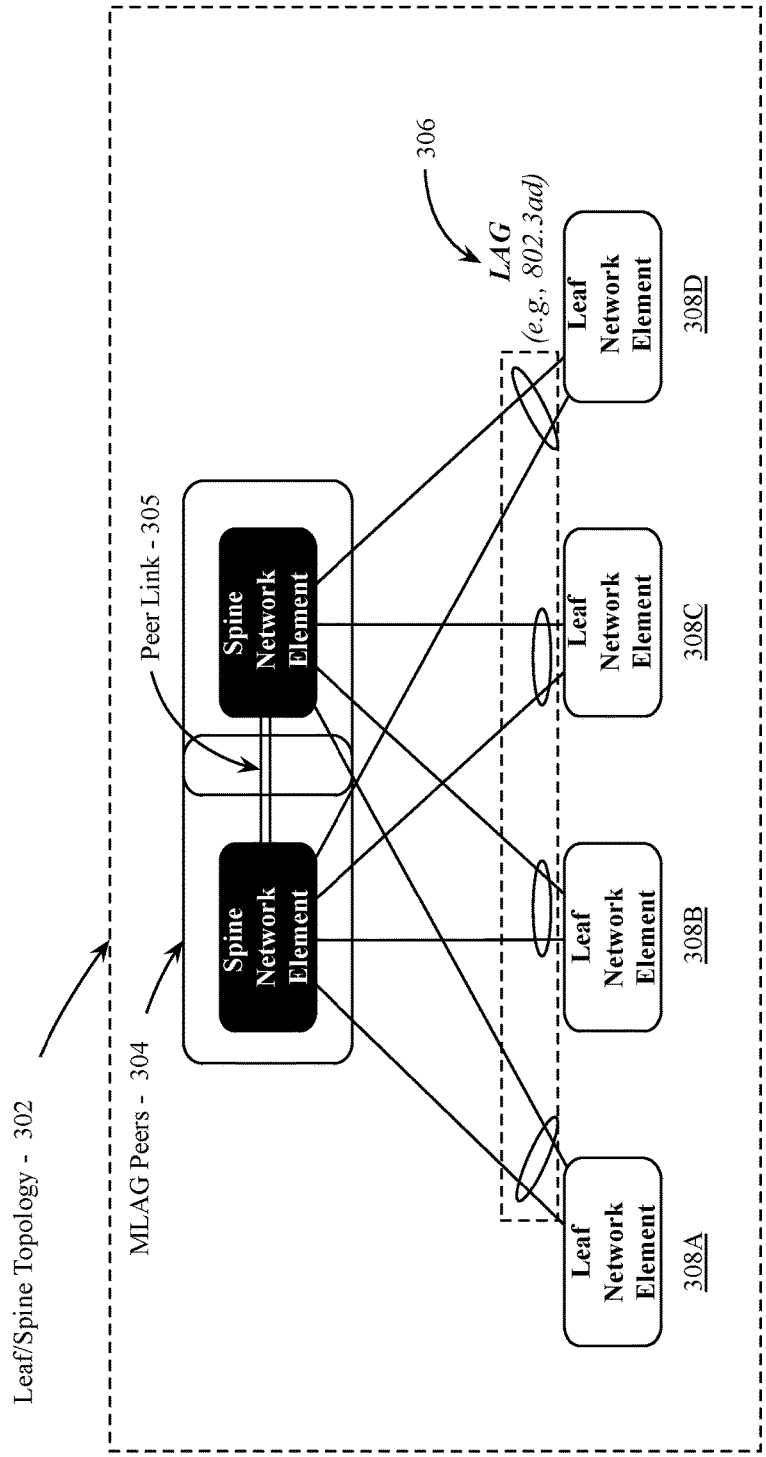
FIG. 3 is a block diagram of a layer-2 protocol fabric with MLAG, according to an embodiment.

FIG. 3 is a block diagram of a layer-2 protocol fabric with MLAG 300, according to an embodiment. In one embodiment the layer-2 (L2) protocol fabric is arranged in a leaf/spine topology 302. While Link aggregation is shown at the spine level, MLAG may also be used at the leaf level to interconnect host devices to the network. In one embodiment the topology includes a set of MLAG peers 304, which are a pair of spine network elements in an aggregated configuration. In one embodiment, the MLAG peers 304 are connected via a peer link 305. The peer link 305 is used to enable communication and synchronization between the MLAG peers 304. Multiple redundant network connections may be used to create the peer link 305. The network connections of the peer link can be assigned to a specific peer-link virtual local area network (VLAN).

The aggregated spine network elements connect to a set of leaf network elements 308A-D, which may be Top of Rack (ToR) switches, or other network elements that terminate connections for hosts, storage, and other service nodes. In one embodiment, each of the network elements 308A-D is doubly connected to MLAG peers 304 in the spine level via a set of active-active 802.3ad connections of the link aggregation groups 306, which balances the network traffic across each link.

In a traditional network design, interconnecting network elements in the manner illustrated may result in a forwarding loop. Accordingly STP may block the interface on the link farthest from the root port, but allow for failover of blocked links in the event of link failure. However, with MLAG enabled, the MLAG peers 304 appear to each doubly connected leaf network element 308A-D as a single logical network element and each LAG 306 appears as a single logical link that has a data rate that is the aggregate of the two links.

While multi-chassis link aggregation as described herein is referred to as MLAG, embodiments described herein provide techniques applicable to all forms of multi-chassis link aggregation, including implementations that are generally compliant with any interpretation of the IEEE 802.1AX-2008 standard. Additionally, some techniques are applicable to link aggregation groups in general and are not limited to multi-chassis link aggregation group.

Figure 4:
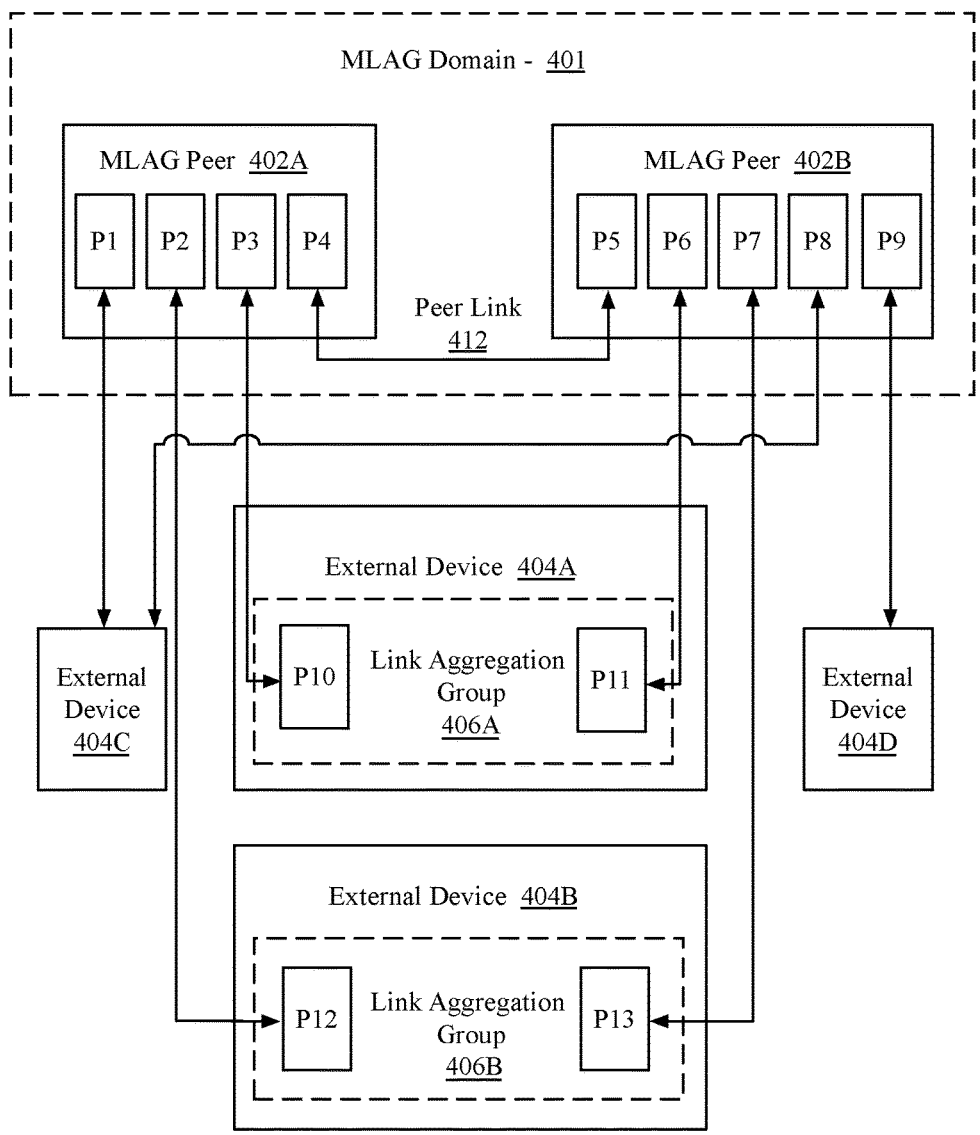
FIG. 4 shows a network element system using MLAG, according to an embodiment.

FIG. 4 shows a network element system 400 using MLAG, according to an embodiment. The network element system 400 includes a set of network elements configured as MLAG peers 402A-B, which may be MLAG peers 304 as in FIG. 3. In one embodiment the MLAG peers 402A-B define an MLAG domain 401. Each MLAG peer 402A-B includes at least one port, but the specific number of ports is not limited. For example, MLAG peer 402A is illustrated as including four ports (P1-P4), while MLAG peer 402B is illustrated as having five ports (P5-P9).

In one embodiment each of the ports P1-P9 can couple to one or more external devices 404A-D, which may be other network elements or networked host devices. Ports connected to an MLAG peer may be referred to as peer ports. At least one port on each MLAG peer 402A-B is configured as a peer port, which is used to form a peer link 412 between the MLAG peers 402A-B. In one embodiment the peer link 412 is a wired connection, although a peer link may also be configured using a tight band wireless link. While one peer link 412 is shown between port P4 and port P5, multiple peer links may be formed between MLAG peers 402A-B. The peer link 412 is connected, established, and/or active when at least one link that is part of the peer link is active. Where the peer link 412 is a physical link, the link is considered to be active when peer ports (e.g., P4 and P5) on each side of the link are active.

A port that is not used to connect the MLAG peers 402A-B may be referred to as a non-peer port. For example, ports P1-P3 of MLAG peer 402A and ports P6-P9 of MLAG peer 402B are non-peer ports that couple to external devices 404A-D. When a network element configured as an MLAG peer 402A-B, the network element is configured to receive a unit of network data (e.g., packet, frame, datagram, etc.) via a non-peer port and determine whether to drop the unit of network data, process the unit of network data as part of a layer-2 control protocol (e.g., Spanning Tree Protocol (STP), Link Aggregation Control Protocol (LACP), Internet Group Management Protocol (IGMP)), or forward the unit of network data via another port.

The determination of whether to drop or forward the data is determined at least in part by whether the MLAG peers 402A-B are configured to forward via a layer-2 (L2) protocol or a layer-3 (L3) protocol. If a network element configured as an MLAG peer 402A-B is operating as a L2 device, the network element uses the destination media access control (MAC) address in the received unit of network data along with a forwarding table stored in memory (e.g., shared memory) of the network element to determine an egress port from which the unit of network data will be forwarded. If the network element is operating as an L3 device, the network element uses the destination L3 protocol address, such as an Internet protocol (IP) address stored in a header of the received unit of network data along with a routing table stored in memory to determine the egress port from which the unit of network data will be forwarded.

In one embodiment, the external devices 404A-D may be a network element (e.g., a switch, a router, etc.), a computer system, or any other device that is able to connect to at least one port in the MLAG domain. For example the MLAG domain 401 may be in the spine layer of a network topology, as with MLAG peers 304 of FIG. 3, and external devices 404A-B may be leaf layer network elements, such as one of leaf network elements 308A-D of FIG. 3. The computer system (with a processor, memory, and persistent storage) may correspond to any type of system that is configured to send and receive network data. Additionally, each network element may be configured with the network element operating system 200 of FIG. 2.

In one embodiment, each external device may be a singly connected device or a dually connected device. A singly connected device is connected to a single port on one of the MLAG peers 402A-B. A dually connected device is connected to at least one port on each of the MLAG peers 402A-B in the MLAG domain 401. For example, external device 404C is a dually connected device that is connected to port P1 of MLAG peer 402A and port P8 of MLAG peer 402B. If an external device is dually connected, then the ports on the external device that are connected to the MLAG domain 401 are collectively referred to as a link aggregation group (e.g., LAG groups 306 as in FIG. 3). For example, external device 404A includes a link aggregation group 406A that includes port P10 and port P11. External device 404B includes a link aggregation group 406B that includes port P12 and port P13.

In one embodiment, for dually connected external devices 404A-C, the MLAG domain 401 appears as a single network element, which may or may not present the same device ID as presented to singly connected external device 404D. For example, from the perspective of external devices 404A-B the MLAG domain 401 appears as a single network element with a single media access control (MAC) address that is different from the MAC addresses of the either of the MLAG peers 402A-B and of ports P1-P9. Further, external device 404A operates as if ports P10 and P11 of link aggregation group 406A are connected to the same network element. External device 404B operates as if ports P12 and P13 of link aggregation group 406B are connected to the same network element. A similar configuration may exist for the network ports of external device 404C.

In one embodiment, to behave, or at least to appear to be a single network element, one of the peers in the MLAG domain 401 is designated as a primary peer and one peer is designated as a secondary peer. The primary peer is responsible for implementing control plane functionality for the MLAG domain 401. Control plane functionality includes implementing the spanning tree protocol (STP) for the MLAG domain 401, which includes generating all configuration bridging protocol data unit messages (also referred to as STP configuration messages), issuing the STP configuration messages over one or more ports in the MLAG domain 401 and processing the received STP configuration messages in accordance with STP. In one embodiment the secondary peer implements its own instance of STP using the STP configuration messages received by the MLAG domain 401.

However, the results of processing the STP configuration messages are not used while the primary peer is active. The MLAG peers 402A-B share forwarding table information via the peer link 412, such that the MLAG peers 402A-B use synchronized forwarding tables. In one embodiment the individual MLAG peers 402A-B each implement their own instance of various layer-2 control protocols such as LACP and IGMP. In one embodiment, while the individual MLAG peers 402A-B implement separate instances of LACP, the MLAG peers 402A-B use the MAC address associated with the MLAG domain 401 (instead of the MAC addresses that are associated with the individual MLAG peers 402A-B).

In one embodiment, both MLAG peers 402A-B are implemented as symmetric MLAG, such that there is no designation of a primary and secondary peer in the MLAG domain 401. In such embodiment the MLAG peers both implement symmetric coordinated instances of STP for all non-peer ports on the MLAG peer. Further, each of the MLAG peers can implement separate instances of the various layer-2 protocols.

With respect to the forwarding tables, when a unit of network data is received on a port in the MLAG domain 401 and there is no entry in the forwarding table on the MLAG peer that received the unit of network data, the MLAG peer that received the data is responsible for generating the forwarding table entry. To generate a forwarding table entry, the MLAG peer 402A-B can first determine whether the ingress unit of network data was received from a port that is part of a link aggregation group (e.g., link aggregation groups 306, 406A-B). If the data was received from a port that is associated with a link aggregation group, the network data is forwarded out of all ports of the MLAG peer, including at least one peer port if there are any singly-connected external devices on the other MLAG peer, except for the ports associated with the ingress link aggregation group.

For example and in one embodiment, an ingress unit of network data received from link aggregation group 406A that has a destination address that is not present in the forwarding table may be flooded to all enabled ports in the MLAG domain 401 other than ports P3 and P6. However, those skilled in the art will appreciate that ports from which network data will be sent are subject to VLAN membership tests, STP topology tests, and/or one or more access control lists (ACLs). Once the information for the forwarding table entry is obtained (e.g., which port in the MLAG peer is associated with the destination MAC address in the ingress unit of network data), the MLAG peer stores this information in its forwarding table and provides the information to the other MLAG peer in the MLAG domain 401. The other MLAG peer may use this information along with link aggregation group information (if present) to generate a forwarding table entry.

In a further example, assuming a unit of network data that is destined for link aggregation group 406A of external device 404A is received at MLAG peer 402B from external device 404B via port P7, and there is no forwarding table entry for the destination MAC associated with link aggregation group 406A, MLAG peer 402B can forward the unit of data out of ports P6, P8, and P9. Once MLAG peer 402B determines that network data with a destination MAC address associated with link aggregation group 406A (e.g., corresponding to external device 404A) should be forwarded via port P6. This forwarding information can be stored in a forwarding table entry in MLAG peer 402B. The forwarding information is also forwarded to MLAG peer 402A, which can create a forwarding entry that associates the MAC address for link aggregation group 406A with port P3. MLAG peer 402A is able to create the forwarding entry because the MLAG peer has information that indicates port P3 of MLAG peer 402A and port P6 of MLAG peer 402B are in a link aggregation group.

Network Management System

The provisioning and maintenance of an MLAG domain can be facilitated by a network management system that has visibility into the configuration state and operational status of the set of network elements operating within a network. In one embodiment, a network management system is provided that provides a network-wide approach for workload orchestration and workflow automation and can provide a turnkey cloud networking solution.

In one embodiment, each network element in the network includes a software system, (e.g., network element software system 200 as in FIG. 2) which continually communicates with the central network management system to synchronize state and receive configuration changes or updates. The central network management system is not limited to any specific software defined network management system, but may be any system which coordinates software configurable network elements in a network and/or datacenter environment.

Figure 5:
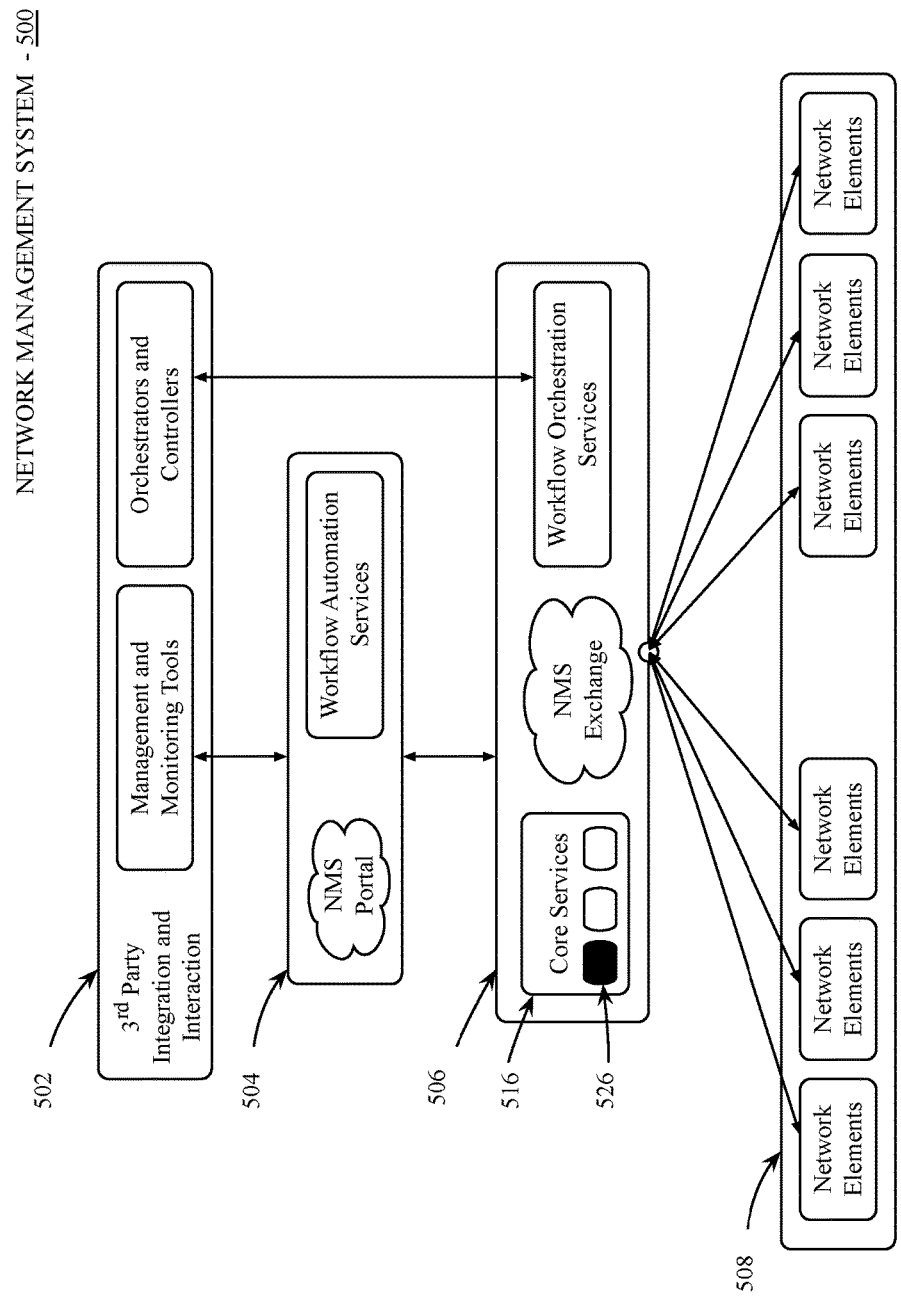
FIG. 5 is a block diagram of a network management system, according to an embodiment.

FIG. 5 is a block diagram of a network management system 500, according to an embodiment. The network management system 500 may be a variant of the CloudVision® Framework provided by Arista Networks™ of Santa Clara, Calif. In one embodiment the network management system 500 has a multi-layer/multi-tier architecture including a $3^{rd}$ party integration and interaction layer 502, a network management system (NMS) portal layer 504, and an NMS exchange layer 506. The network management system 500 may execute as a VM based virtual server on a status resolution servernetwork management device. One or more portions of the network management system 500 may also be configured to execute within the control plane of one or more network elements within the network.

The $3^{rd}$ party integration and interaction layer 502 can include management and monitoring tools, as well as orchestrators and controllers that are provided by $3^{rd}$ party service providers to manage and control a set of network devices. The $3^{rd}$ party service provider tools in the $3^{rd}$ party integration and interaction layer 502 can communicate with an NMS portal layer 504. The NMS portal layer 504 provides a mechanism for the network to achieve cloud scale automation without significant additional development effort. In one embodiment, the NMS portal layer 504 includes workflow automation services that automate network services and provide zero touch provisioning capability for network elements in a network element layer 508, such that network elements may be coupled to the network and centrally provisioned via software. For example, a set of binary software images for the network elements in the network element layer 508 can be stored in a repository and staged for loading onto the network element.

The NMS portal layer 504 can communicate with an NMS exchange layer 506. The NMS exchange layer 506, in one embodiment, is a network-side multi-function control point that may be configured to execute on a network element in the network element layer 508 or can be deployed as virtual machine executing on a host coupled to a network element. The NMS exchange layer 506 includes a set of workflow orchestration services and core services 516 that provide core management services for the network management system. Once the NMS exchange layer 506 is deployed, network elements can be connected to provide a single point for real-time provisioning, orchestration and integration with multi-vendor (e.g., $3^{rd}$ party) controllers. Automatic topology discovery can be performed to utilize state and status information received from each network element in the network element layer 508. The received state and status information can be aggregated and used to provide an overview of the functions and operations of each network element in the network. In one embodiment, a VXLAN Control Service (VCS) enables VXLAN learning by leveraging information available via the NMS exchange layer 506 instead of using multicast flooding.

In one embodiment the core services 516 provided by NMS exchange layer 506 include a link aggregation agent 526 that can act as a status resolution server to facilitate the operations of network elements coupled into a link aggregation group (LAG). The link aggregation agent 526 can act as an intermediary for communication between peers in a LAG, for example, if the network connections of the peer link between a primary and secondary peer in link aggregation group were to fail. Under such circumstance, the secondary peer normally would not have a way to determine whether the primary peer has failed, or if the communication failure is due to a failed peer link or one or more failed peer port on one or both of the LAG peers.

MLAG Split-Brain Detection and Recovery

In some MLAG configurations, when the secondary peer believes the primary peer has failed, the secondary peer is configured to become a primary peer. In the event the primary peer is still active, a 'split-brain' scenario occurs, where each MLAG peer is operating as a primary peer. For doubly connected hosts that are using the MLAG peers for link aggregation, a split-brain scenario results in the forwarding of redundant network data and can create forwarding loops, which may cause errors within the network.

Figure 6:
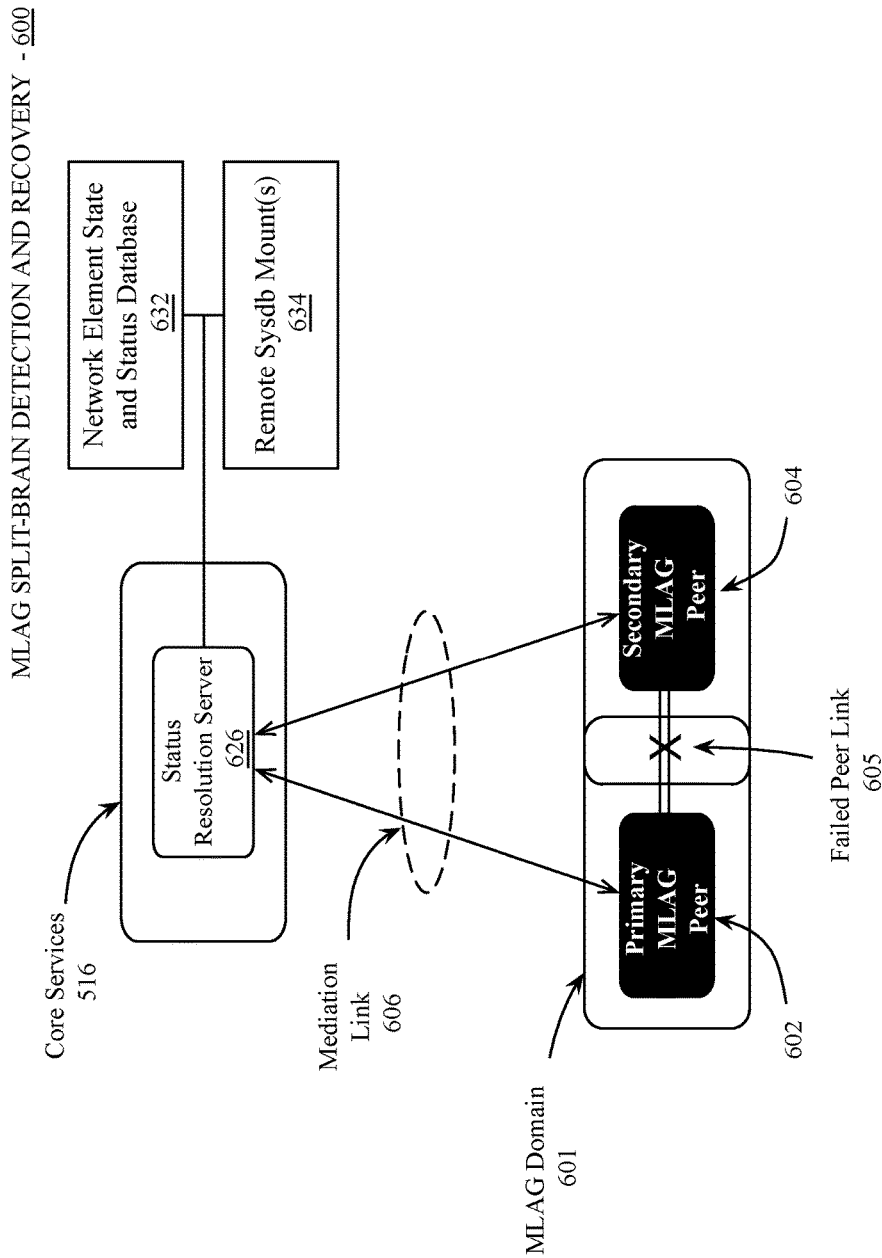
FIG. 6 is a block diagram illustrating an MLAG split-brain detection and recovery system, according to an embodiment.

FIG. 6 is a block diagram illustrating an MLAG split-brain detection and recovery system 600, according to an embodiment. The MLAG split-brain detection and recovery system, in one embodiment, includes the cores services 516 and status resolution server of the network management system 500 of FIG. 5. In one embodiment the status resolution server 626 is a link aggregation agent 526 as in FIG. 5. The status resolution server 626 can couple to a network element state and status database 632 to determine status information of network elements MLAG domain 601. The status resolution server 626 can also access one or more remote Sysdb connections(s) 634 that enable access the central system database (e.g., Sysdb 204 as in FIG. 2) of any network element that includes the network element operating system 200 of FIG. 2. The network element state and status database 632 is a database that aggregates state and status information for multiple network elements within the system and can be implemented using any distributed database system (e.g., HBase™, Cassandra, etc.). Each network element can be configured to continuously stream state information the network management system (e.g., core services 516). The network management system can store the state and status for each network element into the network element state and status database 632. The status resolution server 626 can determine the status for any network element in each of the MLAG domains on the network by querying the network element state and status database 632.

In addition or as an alternative to the use of the network element state and status database 632, the status resolution server 626 can also remotely access one or more remote Sysdb connection(s) 634 for a network element. A remote Sysdb connection allows the status resolution server 626 to access the central system database for a given network element to determine the operational status of the network element.

The status resolution server 626 and core services 516 enable the network elements of an MLAG domain 601 to detect and recover from a split-brain scenario. A split-brain scenario occurs when communication is lost between the network element nodes within a multi-chassis LAG and each node continues to operate as though the other node(s) in the LAG have failed. For example, the MLAG domain 601 of FIG. 6 includes two network elements, where one network element is configured as a primary MLAG peer 602 and one network element is configured as a secondary MLAG peer 604. In the event of a failed peer link 605 between the peer ports of the primary MLAG peer 602 and the secondary MLAG peer 604, the status resolution server 626 may be used as an intermediary for communication between the peers of the MLAG domain 601. In one embodiment, the secondary MLAG peer 604 can query the status resolution server 626 for the status of the primary MLAG peer 602. In the event of the actual failure of the primary MLAG peer 602, the secondary MLAG peer 604 can take over the duties of the failed primary peer. By configuring the secondary MLAG peer 604 to query the status resolution server 626 before assuming the duties of the primary MLAG peer 602, the MLAG split-brain detection and recovery system can prevent a split-brain scenario from ever occurring.

While querying the status resolution server 626 before assuming the duties of the primary can prevent a split-brain scenario occurring, such prevention may come at the expense of a momentary delay in failover if the primary MLAG peer 602 should actually fail. In one embodiment, a secondary peer that suspects the failure of a primary peer can immediately take over the duties of the primary peer and then query the network management system for the status of the primary peer. In the event the primary peer is still active, the secondary-turned-primary peer can revert to a secondary state. Immediately assuming the duties of the primary allows a rapid failure response time (e.g., 50-200 ms) in the event of a primary peer failure. However, in the event of a failed peer link 605, a momentary split-brain scenario may occur. However, the split-brain scenario will be quickly and automatically resolved by the MLAG split-brain detection and recovery system 600. In one embodiment, split-brain detection and resolution can be performed within a period of one to two seconds.

In one embodiment, in the event of a failed peer link 605 and an operational primary MLAG peer 602, the status resolution server 626 can verify that the error is the result of a failed peer link 605 can querying the peer port(s) link status state in a remote Sysdb connection for the primary MLAG peer 602 and/or secondary MLAG peer 604. In one embodiment, the status resolution server 626 can also subscribe to the link status for peer ports connecting the primary MLAG peer 602 and the secondary MLAG peer 604. Via such subscription, state and status agents associated with the core services 516 of the network management system can automatically notify the status resolution server 626 of any changes in the link status for peer links between peers in the MLAG domain 601. In one embodiment, the status resolution server 626 may then proactively intervene to prevent any errors that may occur as a result of the failed peer link 605.

In one embodiment, upon detection of a failed peer link 605, the status resolution server 626 can establish a mediation link 606 between the secondary MLAG peer 604 and the primary MLAG peer 602, allowing the MLAG domain 601 to maintain communication between peers even in the event of a failed peer link 605. In one embodiment the mediation link 606 can be created via the use of an in-band network management API that establishes a communication link between the primary MLAG peer 602 and the secondary MLAG peer 604 via the status resolution server 626. In one embodiment, the status resolution server 626 can establish the mediation link 606 via the use one or more remote Sysdb connection(s) 634. Using the remote Sysdb connection(s) 634, the status resolution server 626 can remotely manipulate the central system databases for the primary MLAG peer 602 and secondary MLAG peer 604 to enable communication between the peers without the use of the failed peer link 605. Once the failed peer link 605 is repaired, peer communication over the peer link can be automatically resumed.

In addition to the status detection via the network element state and status database 632 and the remote Sysdb connection(s) 634, the status resolution server 626 can use other techniques to determine the status of the primary MLAG peer 602 in the event of a failed peer link 605, including techniques known in the art. For example, a heartbeat protocol can be used, where a periodic heartbeat signal is exchanged between the status resolution server 626 and one or more peers of an MLAG domain 601. The heartbeat can be exchanged using in-band communication messages over production network channels or can be exchanged via an out of band management connection between the network management device executing status resolution server 626 and at least the primary MLAG peer 602.

Figure 7:
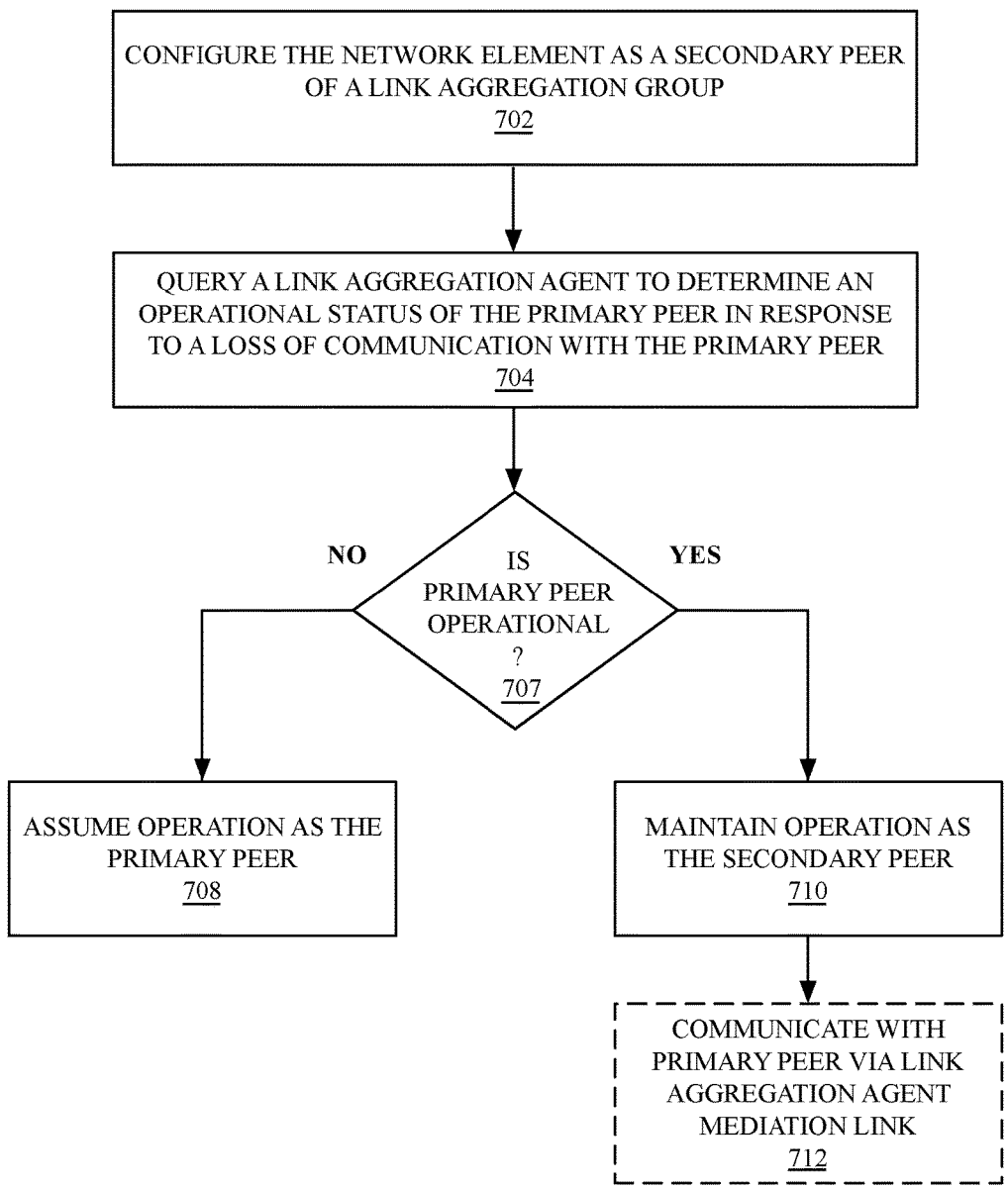
FIG. 7 is a flow diagram of secondary peer operational logic, according to an embodiment.

FIG. 7 is a flow diagram of secondary peer operational logic 700, according to an embodiment. A control plane processor of a network element, such as the CPU 108 of the control plane 104 of FIG. 1, can be configured to perform the secondary peer operational logic 700. In one embodiment the secondary peer operational logic 700 can configure the network element as a secondary peer of a link aggregation group, as shown at block 702. At block 704, the secondary peer operational logic 700 can query a link aggregation agent to determine an operational status of the primary peer in response to a loss of communication with the primary peer. The link aggregation agent, in one embodiment, is a software module executing on a network management device or may be component of a distributed network management system. The loss of communication with the primary peer may be the result of the failure of the set of peer links with the primary peer or may be the result of the failure of the primary peer. The link aggregation agent can communicate with and/or has access to the status of the primary peer and can report the operational status of the primary peer to the secondary peer.

The network element, as shown at block 707, can be reconfigured based on a determination of whether the primary peer is operational. If the primary peer is determined to be no longer operational and the loss of communication is not the result of a peer link failure, the network element can assume operation as the primary peer, as shown at block 708. In one embodiment, by assuming operation as the primary peer, the network element will begin performing the operations previously assigned to the primary peer. The operations assigned to the primary peer can include performing control plane operations for the MLAG domain. Assuming control plane functionality for the link aggregation group domain can include implementing a spanning tree protocol for the link aggregation group domain.

If the primary peer is determined to be operational, the network element can maintain operation as the secondary peer, as shown at block 710. In the event the primary peer is operational and the apparent failure of the primary peer is the result of a peer link failure, a mediation link with the primary peer can be established by the link aggregation agent and the network element can be optionally configured to communicate with the primary peer via the mediation link created by the link aggregation agent, as shown at block 712.

Figure 8:
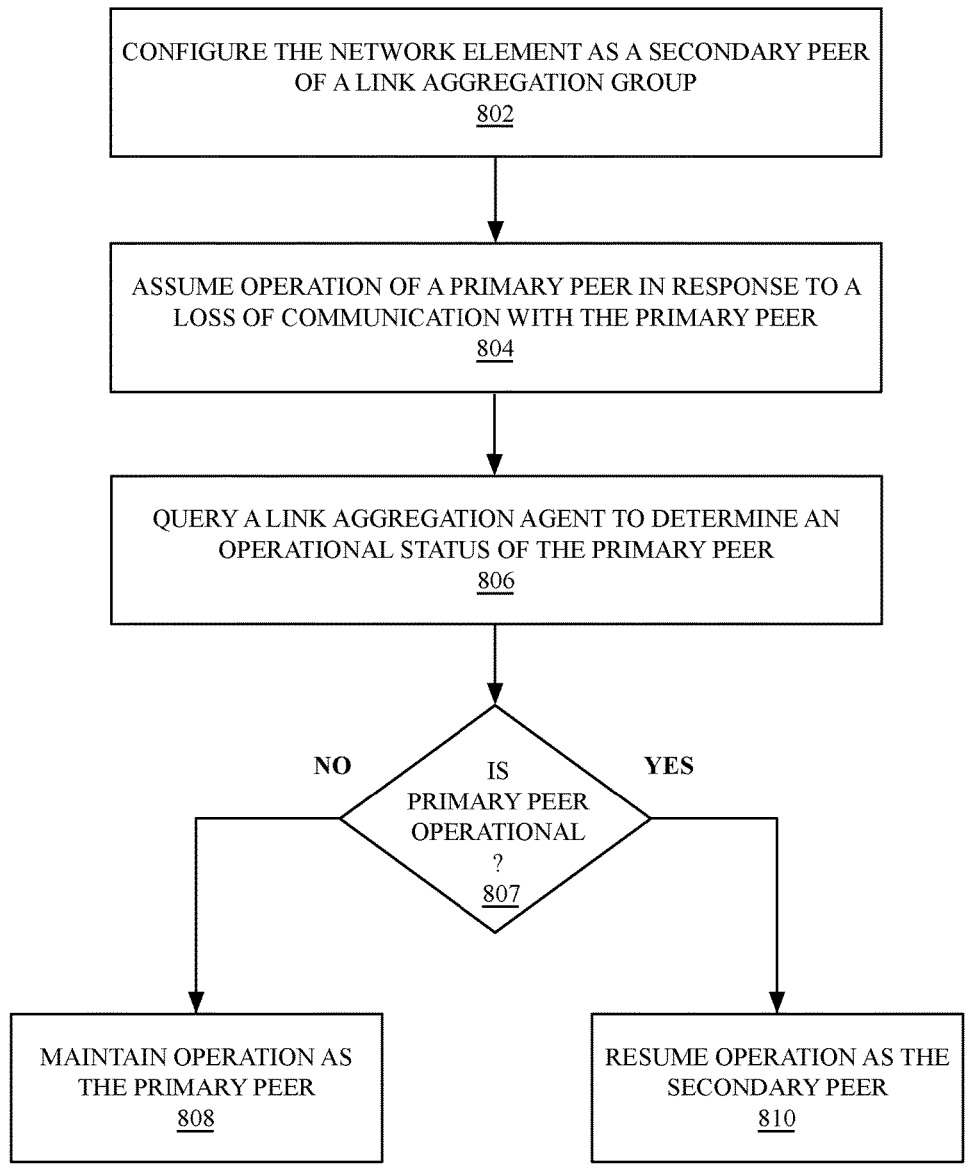
FIG. 8 is a flow diagram of secondary peer operational logic, according to an additional embodiment.

FIG. 8 is a flow diagram of secondary peer operational logic 800, according to an additional embodiment. A control plane processor of a network element, such as the CPU 108 of the control plane 104 of FIG. 1, can be configured to perform the secondary peer operational logic 800. In one embodiment the secondary peer operational logic 800 can configure the network element as a secondary peer of a link aggregation group, as shown at block 802. Instead of querying the link aggregation agent in response to a loss of communication with the primary peer, as in the secondary peer operational logic 700 of FIG. 7, the secondary peer operational logic 800 at block 804 can configure the network element to assume the operations of the primary peer in response to a loss of communication with the primary peer, which appears to the network element as an apparent failure of the primary peer. Assuming operations of the primary peer at block 804, in the event that the primary peer is actually operational, creates a temporary split-brain scenario. At block 806, the secondary peer operational logic 800 can query the link aggregation agent to determine the operational status of the primary peer. The network element, as shown at block 807, can be reconfigured based on a determination of whether the primary peer is operational. If the primary peer is determined to be no longer operational and the loss of communication is not the result of a peer link failure, the network element can maintain operation as the primary peer, as shown at block 808.

If the primary peer is determined to be operational, the network element can resume operation as the secondary peer, as shown at block 810. In one embodiment, in resuming operation as the secondary peer at block 810, the network element can be configured to forward network data for singly connected external devices (e.g., devices connected only to the network element) and to not forward units of network data received from dually connected external devices (e.g., devices connected to both the network element and primary peer). This configuration may be maintained until communication with the primary peer is re-established. In one embodiment, communication with the primary peer can be re-established at least temporarily via a mediation link created by the link aggregation agent.

Exemplary Data Processing System and Modular Network Element

Figure 9:
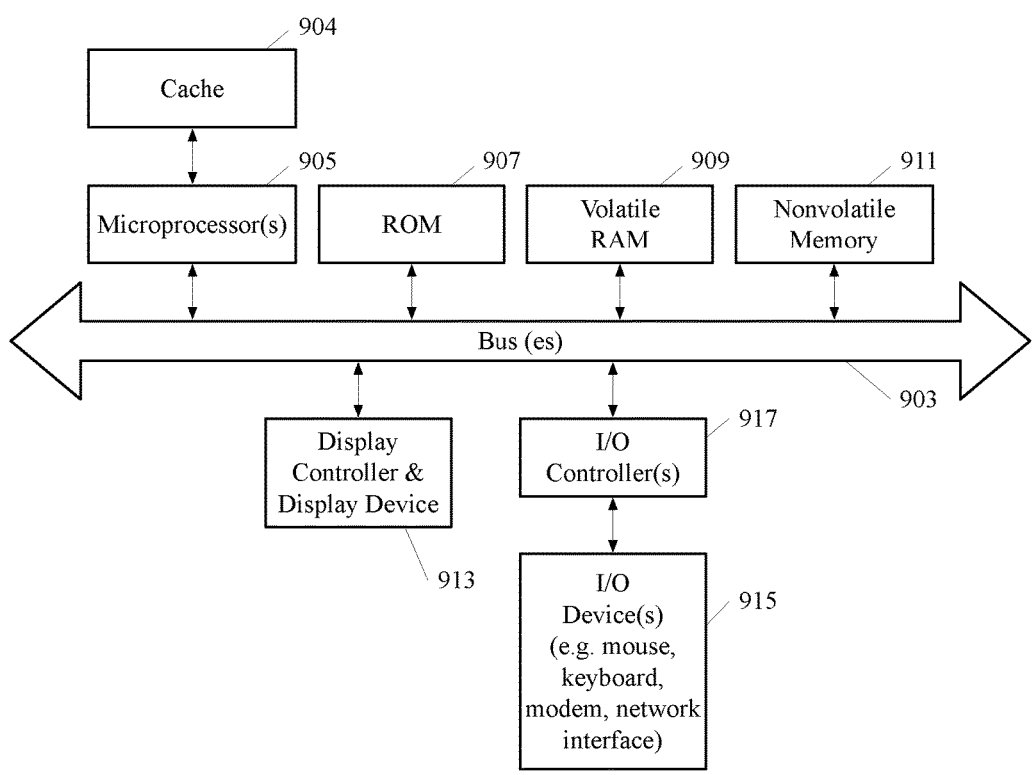
FIG. 9 shows one example of a data processing system, which may be used with one embodiment.

FIG. 9 shows one example of a data processing system 900, which may be used with one embodiment of the present invention. For example, the data processing system 900 may be implemented within any one of the network elements described herein, including network element 100 as in FIG. 1. In one embodiment, the data processing system 900 is used within the control plane of a network element described herein. Note that while FIG. 9 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

The data processing system 900 includes one or more bus(es) 903 which couple to one or more microprocessor(s) 905, ROM (Read Only Memory) 907, volatile RAM 909 and a non-volatile memory 911. In one embodiment, the one or more microprocessor(s) 905 couple to a cache 904, which can include one or more sets of instruction and/or data caches. The bus(es) 903 may include one or more buses connected to each other through various bridges, controllers and/or adapters as is well known in the art.

The microprocessor(s) 905 may retrieve the instructions from the memories 907, 909, 911 and execute the instructions to perform operations described above. Instructions and/or associated data retrieved from the memories 907, 909, 911 may be stored in the cache 904. The bus(es) 903 interconnect system components with each other, and to a display controller and display device 913, and to peripheral devices such as input/output (I/O) devices, which may be mice, keyboards, modems, network interfaces, printers and other devices well known in the art. Typically, the input/output devices 915 are coupled to the system via input/output controller(s) 917. The volatile RAM (Random Access Memory) 909 is typically implemented as dynamic RAM (DRAM), which requires power continually in order to refresh or maintain the data in the memory, but may also include static ram (SRAM), which does not require a periodic refresh.

In one embodiment, the non-volatile memory 911 is used at least in part as mass storage, which typically includes one or more of a magnetic hard drive, a magnetic optical drive, an optical drive, flash memory, or other types of memory systems, which maintain data after power is removed from the system. Typically, the mass storage portion of the non-volatile memory 911 will also be a random access memory although this is not required. While FIG. 9 shows that the non-volatile memory 911 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine-readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 10:
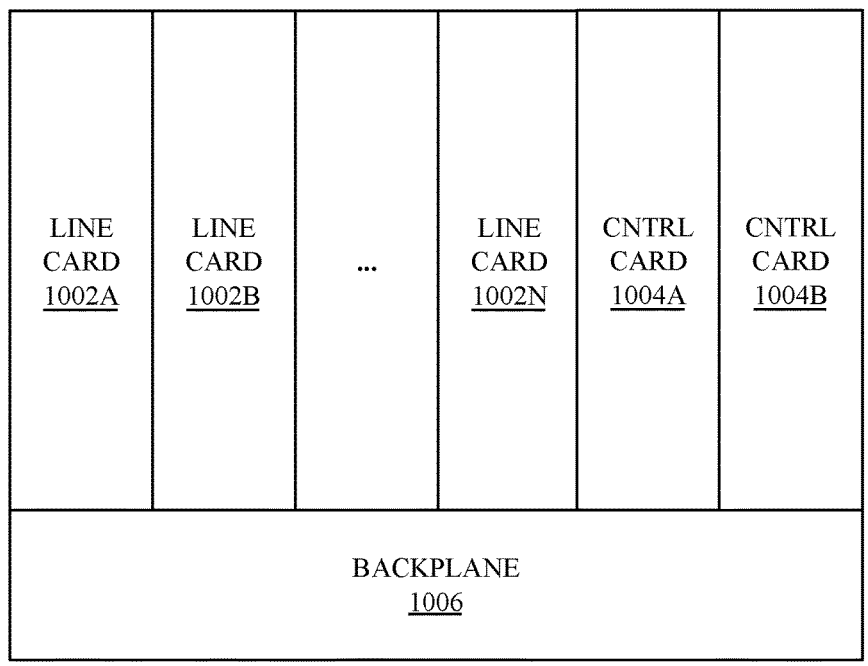
FIG. 10 is a block diagram of an additional embodiment of an exemplary modular network element as described herein.

FIG. 10 is a block diagram of an additional embodiment of an exemplary modular network element 1000 as described herein. In one embodiment, the network element has a modular and expandable configuration that allows the addition or removal of resources configured as line cards 1002A-N, or controller cards 1004A-B coupled to a backplane 1006. In one embodiment, the controller cards 1004A-B control the processing of the traffic by the line cards 1002A-N, which can each include one or more network data forwarding devices such as interfaces 106A-C as in FIG. 1, although the precise nature of the forwarding devices is not limited as such. In addition, the controller card 1004A-B can collect and possibly aggregate timing data as described in FIG. 9 above. In one embodiment, the line cards 1002A-N process and forward traffic according to the network policies received from controller cards the 1004A-B. In one embodiment, one or more of the line cards 1002A-N can monitor and report internal performance data, such as latency data for all or selected units of network data traversing the network element. In one embodiment, the controller cards 1004A-B can also be configured to perform all or a sub-set of functions provided by the line cards 1002A-N. It should be understood that the architecture of the network element 1000 illustrated in FIG. 10 is exemplary, and different combinations of cards may be used in other embodiments.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "measuring," "receiving," "determining," "transmitting," "sending," "forwarding," "detecting," "gathering," "dropping," "communicating," "canceling," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description above. In addition, software aspects of the various embodiments are not described with reference to any particular programming language. It will be appreciated that a variety of programming languages may be used to implement the teachings described herein.

In the description above and in the claims below, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Additionally, the terms "server," "client," and "device" are intended to refer generally to data processing systems rather than specifically to a particular form factor for the server, client, and/or device.

Specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Additionally various components described herein can be a means for performing the operations or functions described in accordance with an embodiment.

While the foregoing discussion describes exemplary embodiments of the present invention, one skilled in the art will recognize from such discussion, the accompanying drawings, and the claims, that various modifications can be made without departing from the spirit and scope of the invention. Therefore, the illustrations and examples herein should be construed in an illustrative, and not a restrictive sense. The scope and spirit of the invention should be measured solely by reference to the claims that follow.

What is claimed is:

1. A network system comprising:
a set of peers within a link aggregation group (LAG), the set of peers including a first network element and a second network element; and
a status resolution server to connect to the set of peers within the link aggregation group, wherein a subset of the set of peers within the LAG is to query the status resolution server to determine an operational status of another peer in the set of peers in response to detection of an apparent failure of that peer by the subset of the set of peers, the status resolution server is to receive a query from the second network element and determine an operational status of the first network element, wherein the second network element is part of the subset of the set of peers, the LAG is a multi-chassis LAG, the status resolution server is a network management device including a link aggregation agent, the link aggregation agent configured to access a remote connection to a central system database of the first network element to determine the operational status of the first network element.

2. The network system as in claim 1, wherein the detection of the apparent failure of the another peer includes detection of a loss of communication with this peer over a peer link including one or more network connections.

3. The network system as in claim 1, wherein the second network element is to periodically query the status resolution server to determine the operational status of the first network element in response to detection of a loss of communication with the first network element.

4. The network system as in claim 1, wherein the status resolution server is to determine the operational status of the first network element via a query to the first network element.

5. The network system as in claim 1, wherein the status resolution server is to determine the operational status of the first network element via a heartbeat protocol.

6. The network system as in claim 1, wherein the status resolution server is to determine the operational status of the first network element via a query of a database that contains a current operational status of multiple network elements.

7. The network system as in claim 1, wherein the status resolution server is to determine the operational status of the first network element via a query of a central system database of the first network element.

8. The network system as in claim 1, wherein the status resolution server includes a remote connection to a central system database of the first network element.

9. The network system as in claim 1, wherein the status resolution server is to determine the first network element is in a failed state and report the failed state of the first network element to the second network element.

10. The network system as in claim 9, wherein the second network element is to assume operational duties of the first network element in response to detection of the apparent failure of the first network element and after receipt of a report of the failed state of the first network element from the status resolution server.

11. The network system as in claim 9, wherein the second network element is to assume operational duties of the first network element upon detection of the apparent failure of the first network element and before receipt of a report of the failed state of the first network element from the status resolution server.

12. The network system as in claim 11, wherein the second network element is to assume operational duties of the first network element upon detection of an apparent failure of the first network element and maintain the operational duties of the first network element in response to receipt of the report of the failed state of the first network element.

13. A non-transitory machine readable medium storing instructions which, when executed by one or more control plane processors of a network element, cause the network element to perform operations comprising:
    configuring the network element as a first peer of a link aggregation group (LAG), the first peer coupled to a second peer via a peer link including one or more network connections, and wherein the LAG is a multi-chassis LAG;
    in response to a loss of communication over the peer link, assuming operations of the second peer by the network element, and
        querying a status resolution server connected by the network element via a network to determine an operational status of the second peer, wherein querying the status resolution server includes querying a link aggregation agent of a network management device; and
    resuming operation as the first peer in response to receiving an indication from the status resolution server that the second peer is operational.

14. The non-transitory machine readable medium as in claim 13, including additional instructions to perform further operations comprising periodically querying the status resolution server in response to the loss of communication over the peer link.

15. The non-transitory machine readable medium as in claim 13, including additional instructions to perform further operations comprising maintaining the operations of the second peer in response to receiving an indication of failure of the second peer from the status resolution server.

16. The non-transitory machine readable medium as in claim 13, wherein assuming operations as the second peer includes forwarding network data for all network devices coupled to the network element.

17. The non-transitory machine readable medium as in claim 13, wherein assuming operations of the second peer include assuming control plane functionality for a link aggregation group domain of the second peer.

18. The non-transitory machine readable medium as in claim 17, wherein assuming control plane functionality for the link aggregation group domain includes implementing a spanning tree protocol for the link aggregation group domain.

19. The non-transitory machine readable medium as in claim 13, additionally comprising communicating with the second peer via a communication link established through the status resolution server.

20. The non-transitory machine readable medium as in claim 13, wherein resuming operation as the first peer includes forwarding network data for network devices coupled only to the network element.

21. A network element comprising:
    a control plane including one or more processors and memory, wherein the control plane is to configure the network element as a first peer of a link aggregation group (LAG), wherein the LAG is a multi-chassis LAG; and
    a data plane coupled to the control plane, the data plane including a network interface having one or more peer ports and one or more non-peer ports, the one or more peer ports to couple to a second peer of the LAG and the one or more non-peer ports to couple to an external device, wherein in response to a loss of communication with the second peer via the one or more peer ports, the control plane is to cause the network element to assume operational duties of the second peer and query a status resolution server for an operational status of the second peer, wherein the status resolution server is a network management device including a link aggregation agent.

22. The network element as in claim 21, wherein the control plane is to periodically query the status resolution server for an operational status of the second peer in response to the loss of communication with the second peer.

23. The network element as in claim 21, wherein the control plane is to resume operation as the first peer in response to receipt of an indication of the operational status of the second peer from the status resolution server.

24. The network element as in claim 23, wherein the control plane is to cause the network element to assume operational duties of the second peer in response to the loss of communication with the second peer via the one or more peer ports after receipt of the indication of the operational status of the second peer from the status resolution server.

25. A network system comprising:
    a link aggregation group (LAG) including multiple network elements, the multiple network elements interconnected via a peer link including one or more network connections;
    a status resolution server to monitor operational status of network elements of the LAG and a link state of the peer link; and
    wherein the status resolution server is further to detect occurrence of a split brain scenario caused by a failure of the peer link and automatically re-configure one or more network elements of the LAG to resolve the split brain scenario by indicating to each network element coupled to the peer link an operational status of other network elements coupled to the peer link and to establish a communication link between the network elements of the LAG to restore communication lost by the failure of the peer link.

26. The network system as in claim 25, wherein the status resolution server is to automatically re-configure one or more network elements of the LAG by performing operations to:
    detect that a first network element has lost connection to a second network element as a result of the failure of the peer link;
    detect that the first network element has assumed operational duties of the second network element;
    determine that the second network element is operational; and
    reconfigure the first network element.

27. A method of managing operations of one or more network elements of a link aggregation group (LAG), the method comprising:
> monitoring operational status of one or more network elements of the LAG, wherein the LAG is a multi-chassis LAG;
> monitoring a link state of a peer link, the peer link including one or more network connections between the network elements of the LAG;
> detecting occurrence of a split brain scenario caused by a failure of the peer link; and
> automatically re-configuring one or more network elements of the LAG to resolve the split brain scenario by indicating to each network element coupled to the peer link an operational status of other network elements coupled to the peer link; and
> establishing a communication link between the network elements of the LAG to restore communication lost by the failure of the peer link.

28. The method as in claim 27, additionally comprising:
> detecting that a first network element has lost connection to a second network element as a result of the failure of the peer link;
> detecting that the first network element has assumed operational duties of the second network element;
> determining that the second network element is operational; and
> reconfiguring the first network element.

29. The method as in claim 28, wherein determining that the second network element is operational includes determining operational status of the second network element via a heartbeat protocol.

30. The method as in claim 28, wherein determining that the second network element is operational includes querying the first network element.

31. The method as in claim 28, wherein determining that the second network element is operational includes querying a database containing a current operational status of multiple network elements.

32. The method as in claim 28, wherein determining that the second network element is operational includes querying a central system database of the first network element.

33. The method as in claim 32, wherein determining that the second network element is operational includes querying a remote connection to the central system database of the first network element.

* * * * *